Sept. 15, 1959  R. P. MULLIGAN  2,904,691
AERIAL PROSPECTING
Filed June 4, 1954  3 Sheets-Sheet 1
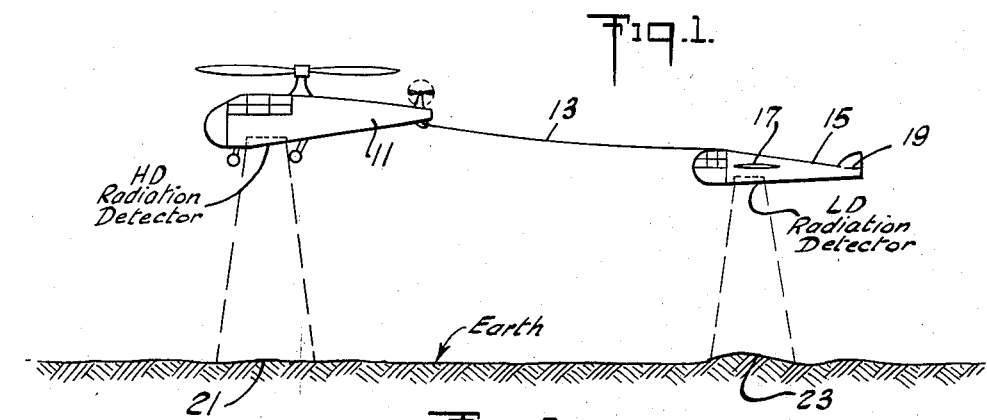
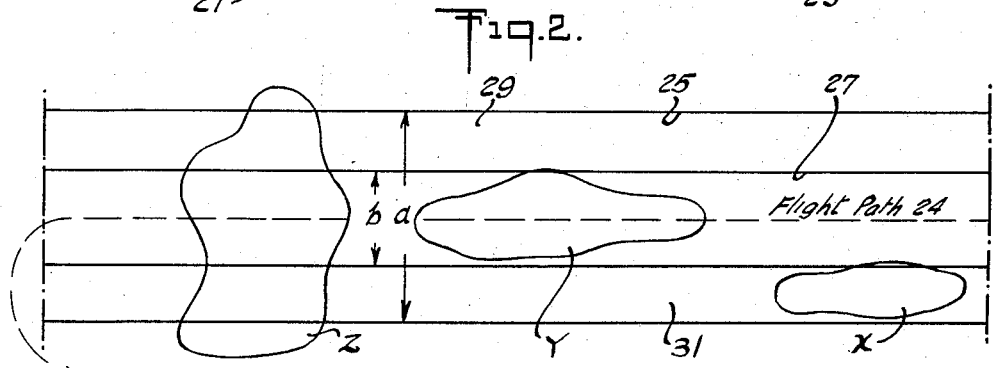
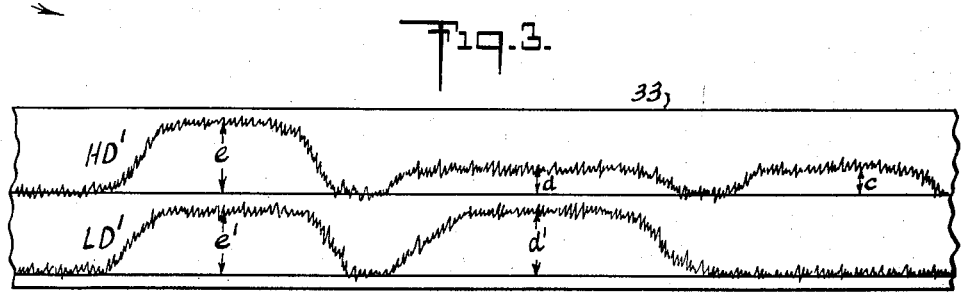
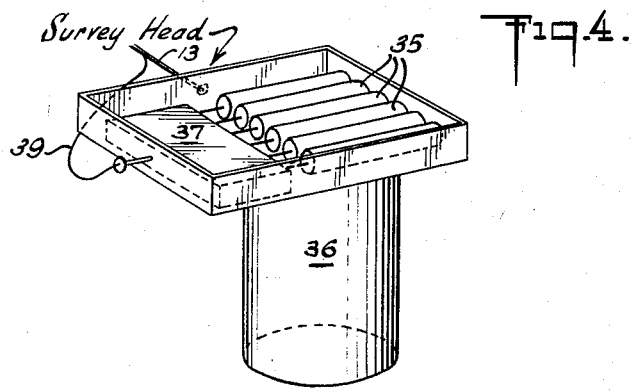

Sept. 15, 1959

R. P. MULLIGAN 2,904,691

AERIAL PROSPECTING

Filed June 4, 1954

AERIAL PROSPECTING

Rex P. Mulligan, White Plains, N.Y., assignor to Texaco Inc., a corporation of Delaware Application June 4, 1954, Serial No. 434,479

8 Claims. (Cl. 250—83.6)

The present invention relates to a novel method of prospecting for minerals by detecting radiation emanating from the ground, for example by detecting positive anomalies caused by gamma rays emanating from radioactive minerals such as uranium and radium ores, or by detecting negative anomalies caused by substantially non-radioactive ores such as iron, copper, lead, zinc and the like. More particularly, the invention is concerned with conducting radioactivity surveys from an aircraft such as a helicopter, fixed wing aeroplane, dirigible, glider or the like, which is flown rapidly over large areas of the earth.

Reference is made to U.S. Patent 2,562,914 for a thorough discussion of ore detection by positive and negative anomalies in measured radioactivity. Briefly, a positive anomaly is produced by ores having greater radioactivity than the surrounding country rock; and a negative anomaly is produced by ores having less radioactivity than the surrounding country rock.

Air-borne radioactivity prospecting has been employed heretofore by flying an aircraft across the surface of the earth while detecting radiation with a single radiation detector unit located within the aircraft. By such a procedure it has been possible to obtain an indication of the extent of mineral deposits within a relatively large area beneath the aircraft, for example a strip of the earth 150 feet wide being examined from a helicopter 150 feet above the earth. Since the ore body detected may lie at any point within the 150 foot width of the strip, its location by subsequent surveying on the surface of the earth has been difficult. The search may be narrowed by reducing the width of the flight lanes, but this requires considerably more traverses of the aircraft across the surface and obviously increases the expense and time for conducting a survey.

In accordance with the present invention the disadvantages of the prior art are successfully overcome by simultaneously flying at least two radiation detectors above the surface of the earth at positions spaced from one another, detecting radiation emanating from the earth with said detectors, recording measurements of the detected radiation, and comparing and correlating the measurements of detected radiation with one another and with the areas of the earth's surface "seen" by the respective detectors to determine the location of mineral bodies more exactly than has been possible heretofore.

In one embodiment of the method of the invention a self-propelled aircraft carrying a radiation detector is flown across the earth at one level while towing a second radiation detector at a lower level but in substantially the same vertical plane. Other embodiments involve flying more than two detectors at successively lower levels; and flying two or more detectors at positions spaced laterally from one another either in the same or different horizontal planes. If desired, the self-propelled aircraft need not carry a detector, in which case the two or more detectors are towed.

The principles of the invention will become apparent from the following detailed description, having reference to the accompanying drawings wherein:

Fig. 1 is a schematic side elevational view showing how two radiation detectors are flown across the earth at different heights in the same vertical plane;

Fig. 2 is a schematic bird's eye view of a part of the earth's surface showing the location of different radioactive ore bodies as related to the flight path of the detectors shown in Fig. 1;

Fig. 3 is a reproduction of a radiation record showing the values of radioactivity measured and recorded by the two radiation detectors of Fig. 1, as related to the ore bodies and flight path shown in Fig. 2;

Fig. 4 is a perspective view showing schematically an arrangement of radiation detectors in a radiation detector unit;

Figure 5:
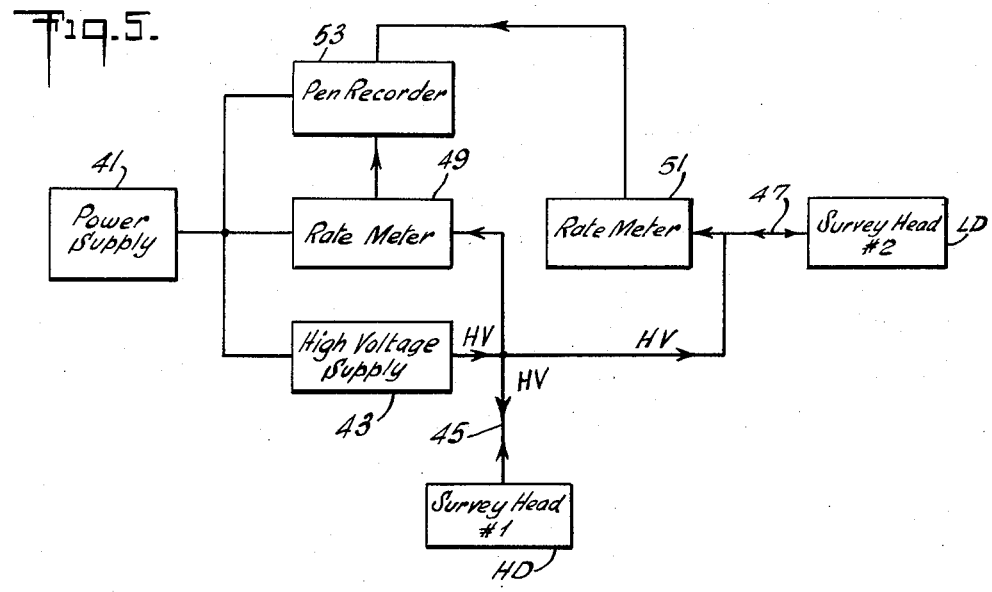
Fig. 5 is a block diagram showing an arrangement of apparatus for measuring and recording detected radiation.

As shown in Fig. 1 a self-propelled aircraft 11 carrying a radiation detector HD is flown across the surface of the earth at a selected height, such as 150 feet for example, while towing behind it on a cable 13 a streamlined glider 15 carrying a second radiation detector LD in substantially the same vertical plane but at a lower level such as 100 feet above the surface of the earth. The relationship between the positions of the aircrafts 11 and 15 is maintained substantially constant by means of adjustable vanes 17 and 19 on the glider 15.

The radiation detector HD at any given point in the survey observes a relatively large area 21 of the earth, while the detector LD observes a considerably smaller area 23. As the aircrafts fly along a straight flight path 24 these observed areas merge continuously to form long narrow lanes, as shown more in detail in Fig. 2.

In Fig. 2 the wide lane 25 of width $a$ is observed by the radiation detector HD while the narrow lane 27 of width $b$ is observed by the radiation detector LD. Both radiation detectors are arranged in the same vertical plane so that the narrow lane 27 is centered within the wide lane 25 and divides the latter into three narrow adjoining strips 27, 29 and 31.

One of the advantages of this novel procedure is that when the radiation detector HD provides an indication of an anomaly in the area of lane 25, the location of the ore producing this anomaly can be determined quite accurately by observing the measurement of radioactivity with the radiation detector LD. If LD shows an anomaly in radioactivity it indicates that the source is probably located within the narrow strip 27 rather than within either of the side strips 29 and 31. Conversely, when the detector LD shows relatively little evidence of an anomaly in radioactivity it indicates that the source must lie either in the strip 29 or the strip 31. Such indications make it possible for a ground party to locate the ore much more quickly and economically than if the entire wide lane 25 had to be prospected on the ground, and more quickly and economically than if a series of separate aircraft flights had to be made along narrow lanes similar to 29, 27 and 31. Consequently, one flight across the surface of the earth accomplishes as much as three flights heretofore.

Another important advantage of the present invention is that it is possible to determine the general shape and extent of an ore body producing an anomaly. For example, referring to Figs. 2 and 3, ore bodies X, Y and Z are shown of different shapes and at different locations within th purview of radiation detector HD. If a single aircraft carrying only a single radiation detector unit were flown along the flight path 24 it would observe the relatively wide lane 25, and upon passing over each of the ore bodies X, Y and Z would detect their presence but not their precise location and shape. For example, as shown in Fig. 3 a strip chart 33 would bear a single trace HD' showing changes in radioactivity above the ore bodies, but the ore bodies could be in any part of the wide lane.

Interpretation is made much more accurate and complete by employing the second radiation detector LD at a lower level to show variations in radioactivity by the trace LD' on chart 33 as the detector passes above the ore bodies X, Y and Z.

Referring to Fig. 3 the change in radioactivity above the ore body X is recorded by a hump of magnitude $c$ in the trace HD' whereas the trace LD' remains unchanged, thus indicating that the ore body X lies in either the strip 29 or 31 rather than in 27. Next, when the detectors pass above the ore body Y the trace HD' assumes a hump of magnitude $d$ whereas the trace LD' assumes a hump of much greater magnitude $d'$, consequently showing that the ore body Y is located predominantly within the central lane 27 and is of a length corresponding to the length of the humps $d$ and $d'$. Next, when the detectors fly above the large ore body Z both traces HD' and LD' exhibit humps of relatively great magnitudes $e$ and $e'$, the magnitude of $e$ being considerably greater than the magnitude of $d$, thus showing that the ore body at least extends along the entire width of the lane 25 and is of a length corresponding to the lengths of the humps $e$ and $e'$.

It is evident that with detailed information of the type described above the work of the prospector is lightened greatly and the cost of prospecting for ores is greatly reduced.

For carrying out the method described above gamma ray radiation detector units of conventional types may be employed, for example, radiation detectors employing Geiger-Mueller tubes, or scintillation counters employing gamma ray sensitive crystals such as thallium-activated potassium iodide or calcium tungstate. Suitable detectors are described in U.S. Patents 2,397,071 and 2,486,944.

As is well known, due to air absorption effects involving different slant ranges and the inverse square law, these together involving an inverse fourth power function, a first uncollimated radiation detector at a lower altitude than a second higher uncollimated detector will have greater resolving power than the latter. In some cases, however, detectors are provided with collimating shields for greater discrimination.

Fig. 4 shows an example of a detector unit comprising a group of 6 individual detectors 35 connected in parallel to a preamplifier and mixer 37. A lead collimating shield 36 acts to define the width of the lane seen by the detectors. The particular detector unit shown is designed for location in a towed glider, and is connected to measuring and recording equipment in the self-propelled aircraft 11 by an electrical conduit 39 running along the towing cable 13.

Fig. 5 shows a typical arrangement of measuring and recording apparatus wherein a power supply 41 is connected to a high voltage transformer 43 which in turn is connected by conduits 45 and 47 to the radiation detectors HD and LD, respectively. Pulses from the two radiation detectors pass up cables 45 and 47 to a pair of rate meters 49 and 51, respectively, which in turn are connected to a dual pen recorder 53 which comprises two recording pens responsive to the counting rates from rate meters 49 and 51, and acting to draw two separate traces HD' and LD' on a strip of paper 33 to produce a record as shown in Fig. 3.

Figure 6:
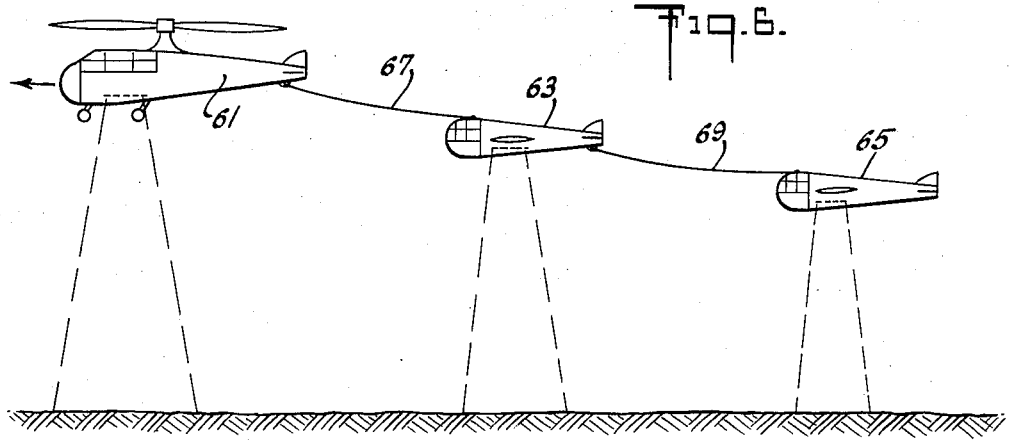
Fig. 6 is a side elevational view showing schematically how three radiation detectors are flown across the surface of the earth at different heights.

Fig. 6 shows a variant of the procedure wherein a self-propelled aircraft 61 tows two gliders 63 and 65 by means of cables 67 and 69 so that radiation is detected at three different levels above the earth's surface. Each of the aircrafts 61 and gliders 63 and 65 carries a radiation detector of the type described above and so connected as to produce three traces of radiation measurements.

The gliders 63 and 65 can be flown in the same vertical plane as the towing aircraft 61, or they can be spaced laterally from the aircraft 61 and from one another if desired.

Figure 7:
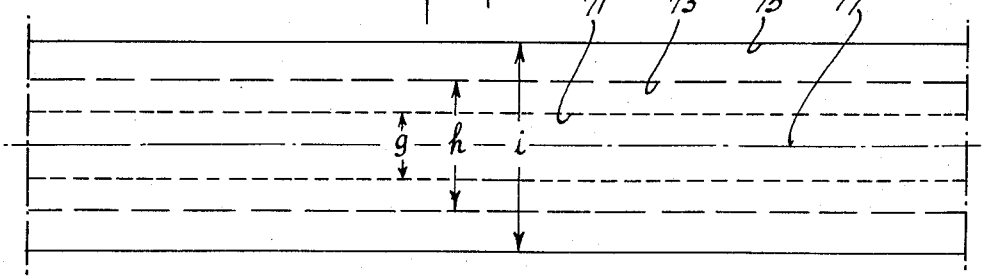
Fig. 7 is a plan view showing the positions of the areas of the earth's surface observed by each of the radiation detectors of Fig. 6.

Fig. 7 shows the arrangement of earth lanes observed by the three radiation detectors of Fig. 6 when flying in the same vertical plane, the detector of glider 65 observing a narrow path 71 of width $g$, the detector of glider 63 seeing a wider path 73 of width $h$, and the detector of aircraft 61 seeing a still wider path 75 of width $i$, all three of the lanes being symmetrical with respect to the flight path 77.

Figure 8:
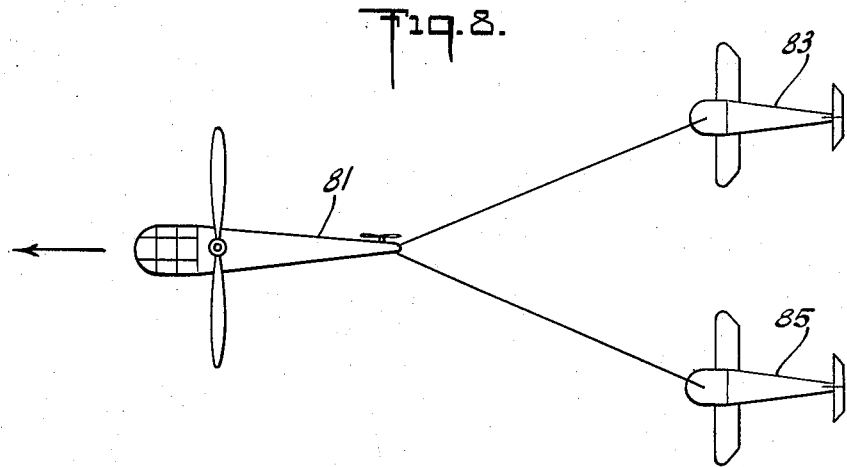
Fig. 8 is a schematic plan view showing how a plurality of radiation detectors are flown across the surface of the earth in laterally spaced relationship to one another.

Fig. 8 shows a self-propelled aircraft 81 towing a pair of gliders 83 and 85 spaced laterally from the aircraft 81 and from each other. Each radiation detector unit located in these aircrafts sees a narrow lane of the earth's surface, and the construction of the detectors is such that all three of the lanes 91, 93 and 95 are contiguous to one another to provide in a single flight a sensitive and accurate representation of radioactivity from relatively narrow adjoining strips of the earth. To examine such equal widths of contiguous paths the gliders 83 and 85 should be flown at the same level as the aircraft 81.

Figure 10:
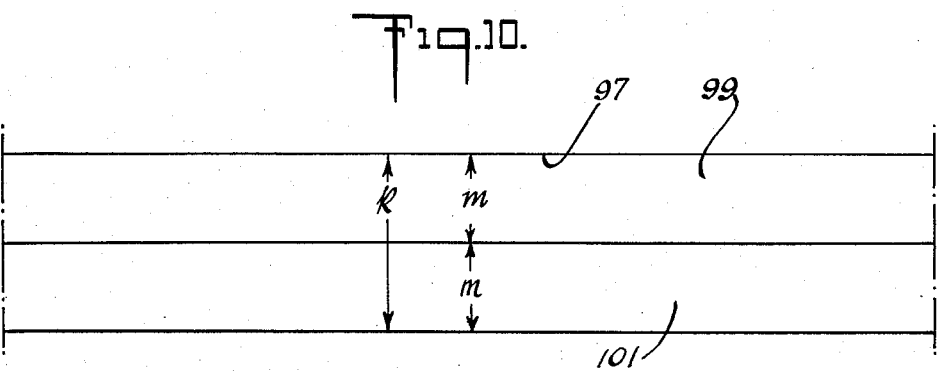
Fig. 10 is a plan view showing a modified arrangement of positions of strips of the earth which can be observed by appropriate collimation of the radiation detectors in Fig. 8.

Sometimes it is desirable to fly the aircraft at a high level and the towed laterally spaced gliders 83 and 85 at lower levels in such a way that the detector of aircraft 81 sees a relatively wide area 97 of the earth's surface of width $k$ while each of the other radiation detectors sees contiguous strips 99 and 101 of the same width $m$, as shown in Fig. 10.

Figure 9:
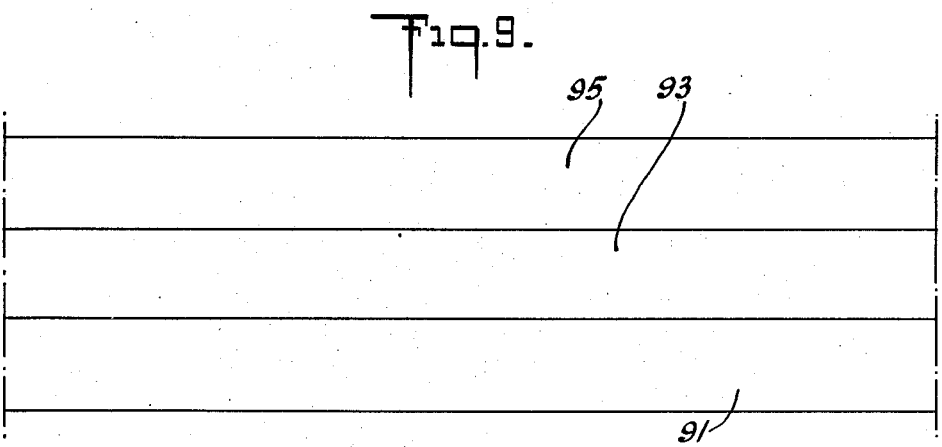
Fig. 9 is a plan view showing the positions of strips of the earth observed by appropriately collimated radiation detectors of Fig. 8.

In airborne surveys conducted in accordance with the invention it is essential that the traces obtained, say those of Figs. 8 and 9, be correlated with the terrain over which the survey is made. This may be done in several ways.

One simple way is to provide an automatic time marker in the recorder, so that the time each portion of the trace is recorded is known. The operator of the detector notes the exact time that the aircraft is directly above prominent landmarks along the traverse, or above monuments or markers disposed on the ground along the traverse, and thus is able to correlate surface with trace by means of time.

Another but more complicated method is to employ a camera which is geared to the recorder of the detector. In this way a series of pictures of the underlying terrain is taken as the traverse is flown simultaneously with the recording of the trace of radiation intensity and correlated therewith.

Obviously, many modifications and variations of the invention, as hereinbefore set forth, may be made without departing from the spirit and scope thereof, and therefore only such limitations should be imposed as are indicated in the appended claims.

I claim:
1. A method of radioactivity aerial surveying com- prising simultaneously flying at least two radiation detectors at different levels above the surface of the earth at positions spaced a substantial distance from one another, detecting gamma rays emanating from the earth with said detectors, recording measurements of the detected radiation, and correlating said measurements of detected radiation with one another and with the areas of the earth's surface seen by said detectors to detect anomalies and thereby determine the location of mineral bodies.

2. A method in accordance with claim 1, wherein said radiation detectors are spaced both laterally and vertically from one another.

3. A method in accordance with claim 1, wherein said radiation detectors are at different levels above the earth's surface, and fly in substantially the same vertical plane.

4. A method in accordance with claim 1, wherein said measurements are recorded on a single chart.

5. A method in accordance with claim 1 wherein one detector is carried by a self-propelled aircraft and wherein another detector is towed by said self-propelled aircraft and wherein said two detectors are flown at different levels above the earth's surface and substantially in the same vertical plane.

6. A method of radioactivity aerial surveying comprising simultaneously flying at least two radiation detectors above the surface of the earth at positions spaced a substantial distance from one another, said detectors being flown in substantially the same vertical plane, at least one of said detectors being flown at a lower altitude than another detector so that said lower detector is sensitive to a smaller portion of said area being surveyed than said higher detector, detecting gamma rays emanating from the earth with said detectors, recording measurements of the detected radiation, and correlating said measurements of detected radiation with one another and with the areas of the earth's surface seen by said detectors to detect anomalies and thereby determine the location of mineral bodies.

7. A method of radioactivity aerial surveying comprising flying a first radiation detector above the surface of the earth while detecting radiation emanating from the full width of a lane traversed by said aircraft and simultaneously flying a plurality of detectors at an altitude spaced a substantial distance below the altitude of said first detector and wherein the detectors flown at the lower altitude separately detect radiation emanating from narrow strips adjoining one another across the entire width of said lane.

8. The method of claim 7 wherein said first detector is carried by a self-propelled aircraft and said plurality of detectors are towed by the self-propelled aircraft.

References Cited in the file of this patent

UNITED STATES PATENTS

| | | |
|---|---|---|
| 2,557,158 | Teichmann | June 19, 1951 |
| 2,617,945 | Lord et al. | Nov. 11, 1952 |
| 2,656,470 | Herzog | Oct. 20, 1953 |
| 2,767,326 | Stratford | Oct. 16, 1956 |